United States Patent [19]

Sato et al.

[11] Patent Number: 5,319,487
[45] Date of Patent: Jun. 7, 1994

[54] INFRARED DATA TRANSMISSION-RECEPTION SYSTEM

[75] Inventors: Masaru Sato; Masayuki Suematsu, both of Tokyo; Yasushi Matsumoto, Kanagawa, all of Japan

[73] Assignee: Sony Corporation, Tokyo, Japan

[21] Appl. No.: 897,474

[22] Filed: Jun. 12, 1992

[30] Foreign Application Priority Data

Jun. 25, 1991 [JP] Japan ............................ 3-178940

[51] Int. Cl.$^5$ ............................................ H04B 10/00
[52] U.S. Cl. ............................ 359/142; 359/146; 340/825.72; 348/734
[58] Field of Search ............. 359/142, 144, 146, 172, 359/158; 358/194.1; 340/825.72; 375/23, 60

[56] References Cited

U.S. PATENT DOCUMENTS

| | | | |
|---|---|---|---|
| 4,514,732 | 4/1985 | Hayes, Jr. ............................ | 359/142 |
| 4,802,114 | 1/1989 | Sogame ................................ | 359/146 |
| 4,912,524 | 3/1990 | Nakamura et al. ................... | 359/146 |
| 4,931,790 | 6/1990 | Kobayashi et al. ................ | 340/825.72 |
| 5,214,642 | 5/1993 | Kunimoto et al. ..................... | 370/82 |

Primary Examiner—Richard E. Chilcot, Jr.
Assistant Examiner—K. Negash
Attorney, Agent, or Firm—Lewis H. Eslinger; Jay H. Maioli

[57] ABSTRACT

An infrared data transmission and reception system capable of avoiding adverse effects due to infrared external noises includes a data transmitting circuit and a data receiving circuit of which the former is so constructed as to add a signal-free region of a predetermined length or a trailer to the terminating end of each of the frames of a data bit pulse train and the latter is so constructed as to discriminate between transmitted data and external noise by detecting whether or not the region corresponding to the trailer is signal-free with respect to a detected output, whereby a proper encoding output is generated on the basis of the discrimination.

6 Claims, 8 Drawing Sheets

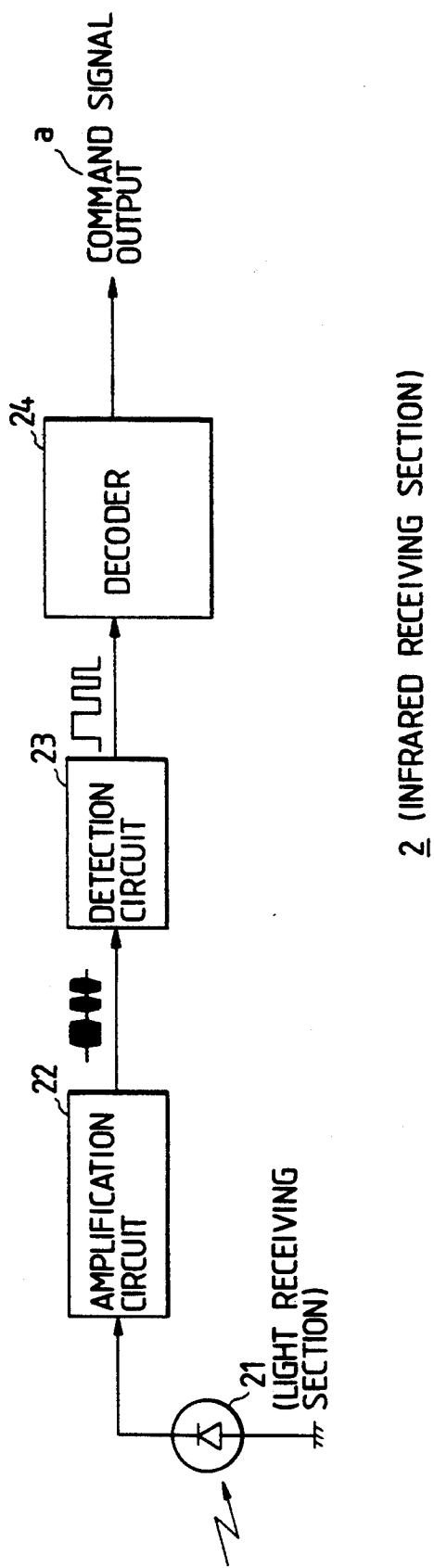

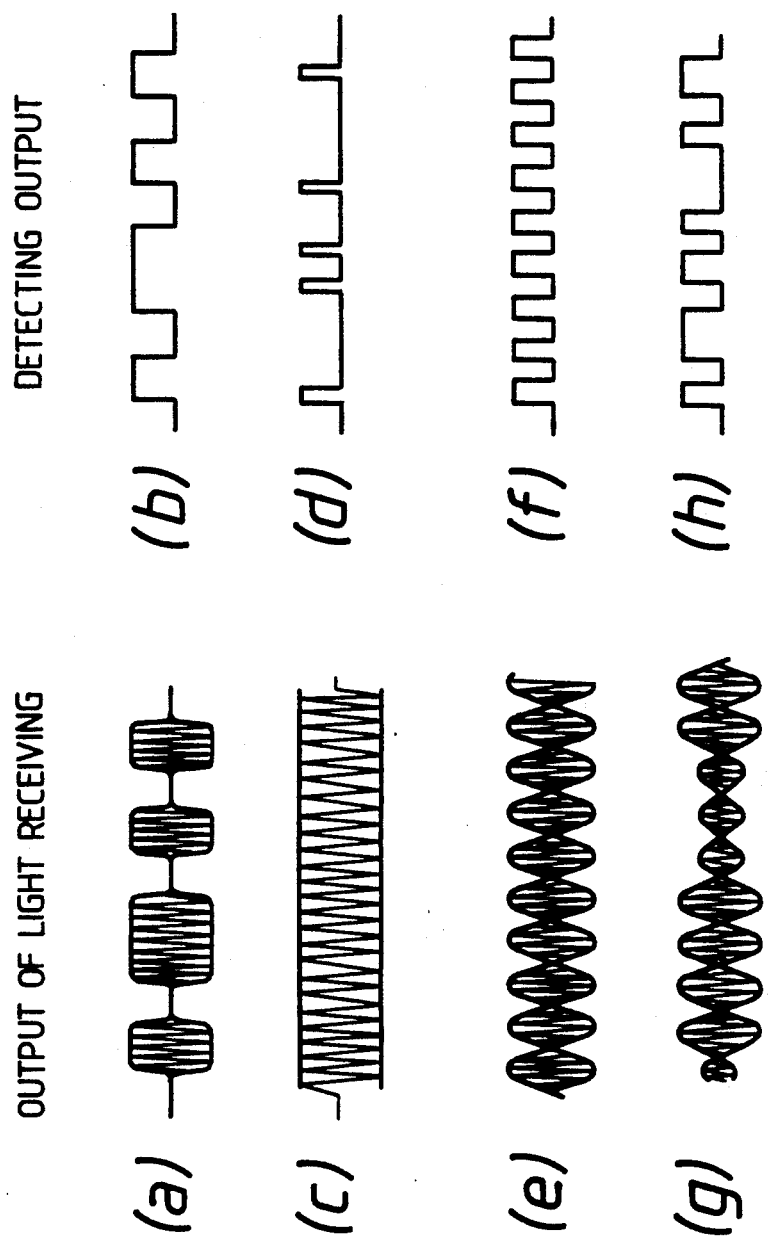

INFRARED DATA TRANSMISSION-RECEPTION SYSTEM

BACKGROUND OF THE INVENTION

1. Field of the Invention

The present invention relates to an infrared data transmission-reception system capable of transmitting and receiving various kinds of data such as command data for remote-controlling electronic equipment.

2. Description of Prior Art

The conventional infrared data transmission-reception system comprising data transmitting means and data receiving means has widely been put to practical use as, for example, a remote operating means for controlling electronic equipment through an infrared remote controller. The data transmitting means is capable of generating various kinds of data in the form of infrared signals obtained as a result of modulating data bit pulses and the data receiving means is capable of obtaining predetermined data from the data bit pulses obtained by demodulating the infrared signals generated from the data transmitting means.

There are various types of electronic equipment such as a television receiver, disk player, VCR, air conditioner and etc., which can be operated by a distant user in various kinds of modes through a remote controller for generating infrared signals.

The remote controller exclusively used for the above-mentioned electronic equipment generates a command signal coded in a specific format in correspondence to the operation designated by the user and the command signal is then converted into an infrared signal by a light-emitting diode so as to be transmitted as an output to the electronic equipment. The electronic equipment is provided with an infrared receiving unit and a demodulating unit of which the former detects the outputted infrared signal and the latter demodulates the signal into an electrical command signal to be inputted to a system control unit which performs a control operation based on the command signal.

In FIG. 6, there is conceptually shown the structure of an infrared remote control system mounted in a monitor television receiver, stereo system amplifier and etc., wherein reference numeral 1 designates a remote controller as a data transmitting means which is provided with an operating key 1a and a rotary operating section 1b so as to allow the user to perform a predetermined operation by pressing the key or rotating the rotary section whereby predetermined control data (data bit pulses) is generated and outputted from an infrared output section 1c after the data is modulated.

On the other hand, designated by reference numeral 2 is an infrared receiving unit arranged within the body of the electronic equipment so as to act as a data receiving means. This unit 2 receives infrared control data generated from the remote controller 1 and demodulates it into an electrical signal. The demodulated control data (command signal) is then supplied to a microcomputer 3 as an equipment control means which latter supplies control signals to predetermined processing circuits (4a, 4b, 4c) such as an video signal processing unit, audio signal processing unit, tuning unit, power source circuit and etc. mounted in the electronic equipment, in accordance with the control data it receives, thereby performing predetermined processings.

The above-mentioned remote controller 1 as the data transmitting means and the infrared receiving unit 2 as the data receiving means are constructed as shown in FIGS. 7 and 8, for example.

Regarding the remote controller 1, when operation information is supplied to an encoder 11 from the operating key 1a or rotary operating section 1b, a train of data bit pulses as a command signal is outputted in correspondence to the operation and supplied to a modulation unit 12 which has a carrier of e.g., 40 kHz supplied from a carrier generating unit 13. In the modulation unit 12, the 40 kHz carrier is modulated by the train of data bit pulses from the encoder 11 and the modulated signal is supplied to an infrared output unit 14. Thus, when the modulating signal performs ON/OFF drive on a transistor $T_R$, an infrared output corresponding to the modulating signal is obtained from a light-emitting diode D.

Meanwhile, the infrared receiving unit 2 receives the infrared output through its light-receiving section 21, and after converting the output into an electrical signal, supplies the converted signal to a detection circuit 23 through an amplification circuit 22 to thereby obtain a train of data bit pulses. The train of data bit pulses thus obtained is then decoded by a decoder 24 so that, for example, control data (a command signal) to be supplied to the microcomputer 3 may be obtained.

Recently, an inverter-based high-frequency fluorescent lamp has become widespread as an indoor illumination device. However, since such type of illumination device performs a lighting operation by using pulses of around 40 kHz, the infrared output from the illumination device has had a signal waveform quite similar to that of the infrared output (40 kHz carrier) from the remote controller 1 and accordingly, there has arisen a problem of the electronic equipment operating erroneously when the illumination device is lighted.

To meet this problem, it has been practiced that for example, the frequency band of the remote controller is shifted from that of the illumination device such that the carrier of the remote controller 1 is made to fall in the range of 33~40 kHz while the pulses from the illumination device fall within the range of 40~50 kHz, thereby avoiding the occurrence of mutual interference.

However, where the incident light is intense, the amplification circuit 22 of the infrared receiving unit 2 is saturated to become inoperative and when the inverter-based high-frequency fluorescent lamp has become further popularized and become versatile in type as having a plurality of unit lamps with a plurality of inverters, there arise beats among infrared pulses with, the wave form of the beats becoming quite similar to that of the infrared output of the remote controller 1 which results in that the command signal can not be distinguished from external noises causing the electronic equipment to operate erroneously and the accuracy of the remote-controlling operation can not be sufficiently maintained by mere division of the frequency band.

The data bit pulse modulating signal from the remote controller 1 comprises a train of bits as shown in FIG. 9(a) which is formed of a gathering of bursts of 33~40 kHz with a predetermined bit train forming one frame and the signal is outputted repeatedly per frame. The modulating signal comprising such frame unit bit train comes to be present at the output of the light-receiving section 21 of the infrared receiving unit 2 and is detected at a detection circuit 23 to thereby obtain the data bit pulses as shown in FIG. 9(b).

Next, where the infrared receiving unit 2 has received the infrared output from an inverter-based signal fluorescent lamp, a continuous 40 kHz level signal shown in FIG. 9(c) appears at the output of the light-receiving section 21 but when there is no alternating change, it is easy to make any detected output unobtainable. Further, although there is sometimes a case in which a detected output as shown in FIG. 9(d) appears due to a weak input of a level close to the operation-start level of the detection circuit 23 or due to an alternating fluctuation caused by a ripple on the fluorescent lamp power source, such output can be discriminated sufficiently at a decoder 24 because it is in the form of random pulses and it is therefore possible to avoid generation of any erroneous operation on the electronic equipment.

Now, where two fluorescent lamps are lighted with two inverters, respectively, both of the inverters generate stabilized sine waves (e.g., 45.000 kHz and 45.660 kHz) so that beats generate due to a frequency difference between infrared pulses and a ripple output having a beat frequency envelope formed therein as shown in FIG. 9(e) is outputted from the light-receiving section 21. This ripple output is generated as an accurate pulse train as shown in FIG. 9(f) at the detection circuit 23 and is sometimes decoded erroneously by the decoder 24. That is, it sometimes happens that an erroneous operation takes place on the electronic equipment.

Further, where an additional fluorescent lamp with an inverter of 45.010 kHz is lighted simultaneously with the above-mentioned two fluorescent lamps, the output of the light-receiving section 21 which has received the infrared outputs from these fluorescent lamps will be as shown in FIG. 9(g) so that the detected output will be as shown in FIG. 9(h). In other words, a predetermined frame period generates on the detected output so that the output becomes more similar to the infrared output from the remote controller 1 resulting in a great increase in the probability of generation of an erroneous operation.

Moreover, with an increase in the number of inverter-based fluorescent lamps lighted simultaneously, it becomes difficult for the infrared receiving unit 2 to distinguish between the infrared output from the remote controller and the noises from the fluorescent lamps.

SUMMARY OF THE INVENTION

Accordingly, an object of the present invention is to provide an infrared data transmission-reception system which is capable of overcoming the above-mentioned problems involved in the conventional system.

The infrared data transmission-reception system according to the present invention comprises an infrared data transmitting means capable of generating various kinds of data in the form of an infrared signal obtained as a result of modulating a train of data bit pulses and a data receiving means capable of receiving predetermined data from a train of data bit pulses obtained by demodulating the infrared signal from the data transmitting means.

One aspect of the present invention resides in that the data transmitting means is so constructed as to add to the terminating end of each of frames of the train of data bit pulses a signal-free region of predetermined length while the data receiving means is so constructed as to determine whether or not a portion of a demodulated data bit pulse train corresponding to the signal-free region of the initial data bit pulse train is signal-free and to generate as received data data obtained by decoding the demodulated data bit pulse train only when that portion is found signal-free.

Another aspect of the present invention resides in that the data transmitting means is so constructed as to add to the terminating end of each of frames of a data bit pulse train a region of a pulsating signal of a predetermined length having a pulse repetitive period of more than double the data bit pulse train while the data receiving means is so constructed as to determine whether or not a portion of a demodulated data bit pulse train corresponding to the pulsating signal region of the initial data bit pulse train is formed of the pulsating signal and to generate as received data data obtained by decoding the demodulated data bit pulse train only when that portion is found to be formed of the pulsating signal.

The infrared output (external noises) of a high frequency inverter-based fluorescent lamp is in the form of continuous waves and therefore, the waveform of beats of a plurality of infrared outputs tends to become continuous and no partial frequency change takes place with the infrared output.

Accordingly, for data transmission purposes, it is possible to accurately discriminate between external noises and transmission data by providing in the transmission data a signal-free region of a predetermined length or by adding there to a region of a pulsating signal of a predetermined length having a pulse repetitive period of more than double that of the data bit pulses.

BRIEF DESCRIPTION OF THE DRAWINGS

FIG. 8 is a block diagram of a conventional infrared receiving means; and

FIGS. 9(a)–(h) are a diagram showing wave-formes per bit of data bit pulses and external noises to be received by the infrared receiving unit.

PREFERRED EMBODIMENTS OF THE INVENTION

Figure 1:
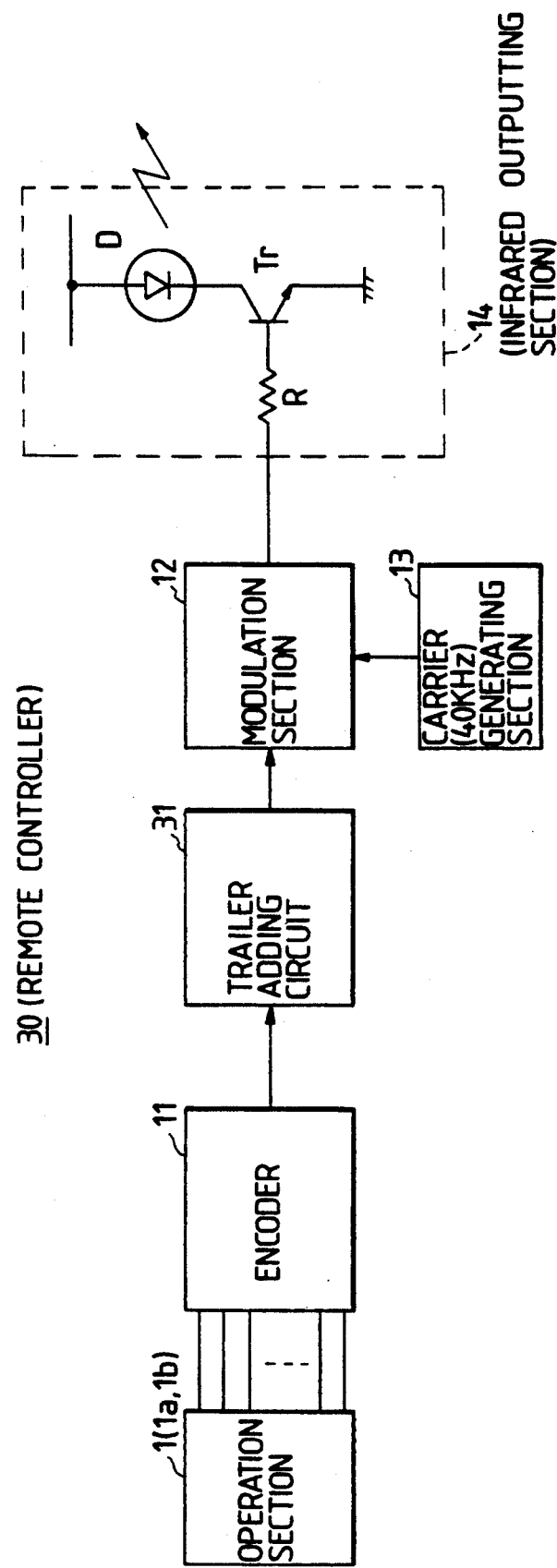
FIG. 1 is a block diagram of a data transmitting means forming part of an infrared data transmission-reception system according to the present invention.
Figure 2:
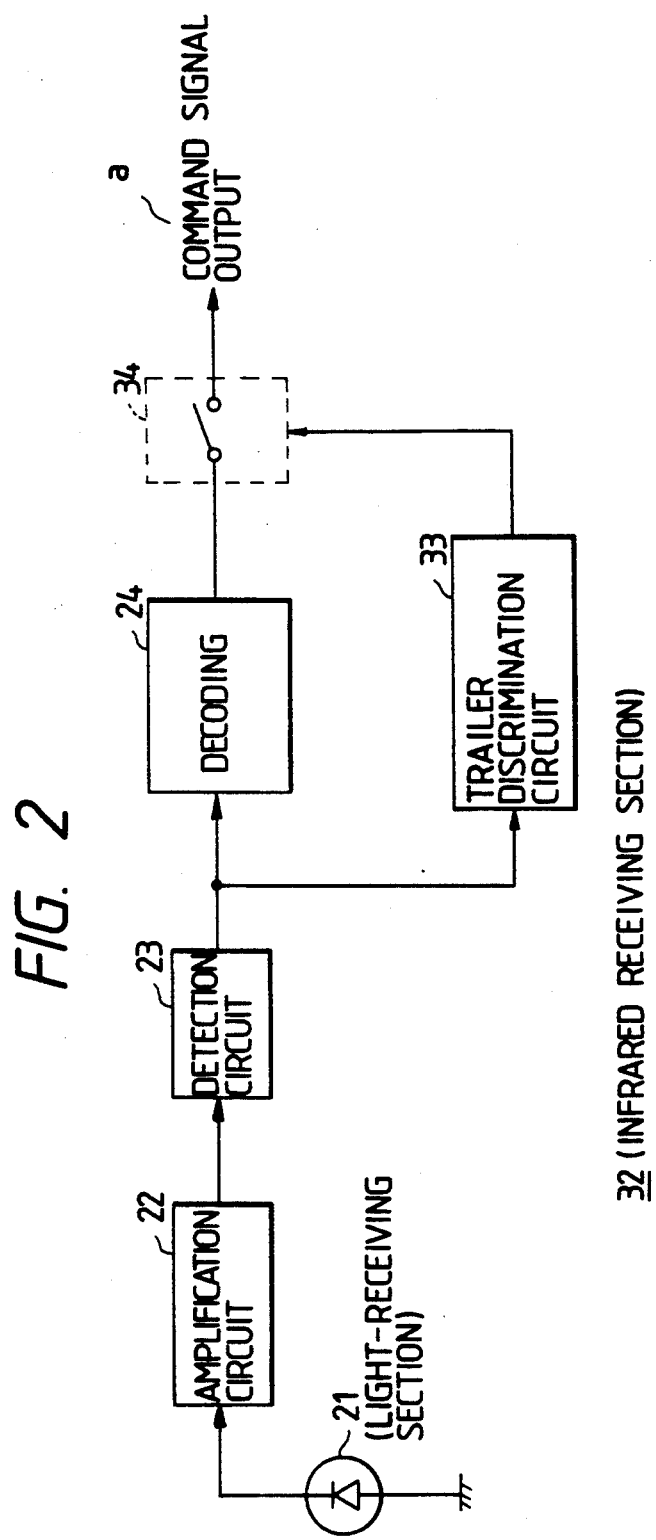
FIG. 2 is a block diagram of a data receiving means forming part of the infrared data transmission-reception system according to the present invention.
Figure 7:
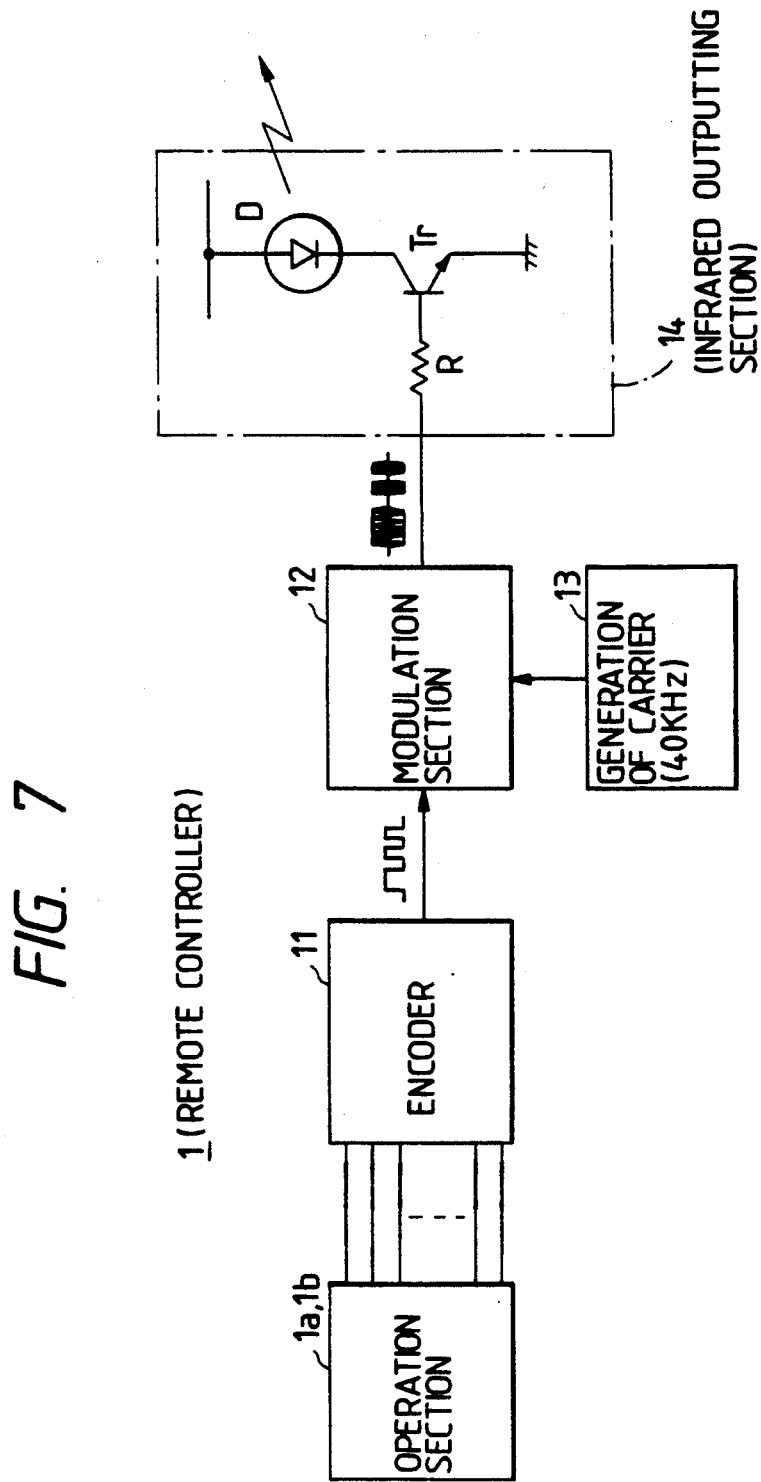
FIG. 7 is a block diagram of a conventional remote controller.

FIG. 1 is a block diagram of a remote controller as a data transmitting means of an infrared reception-transmission system as one embodiment of the present invention and FIG. 2 is a block diagram of an infrared receiving unit as a data receiving means arranged within an electronic apparatus. In these figures like parts are designated by like reference numerals with respect to FIGS. 7 and 8 relating to the conventional system and for the sake of simplicity, no repetitive explanation is made on these parts.

As seen from FIG. 1, a remote controller 30 includes a trailer adding circuit 31 which is adapted to add a 6 msec period signal-free trailer immediately after the last bit of each of frames of a train of data bit pulses generated from an encoder 11 in correspondence to an operating means 1a or 1b of an operating unit 1.

Figure 3:
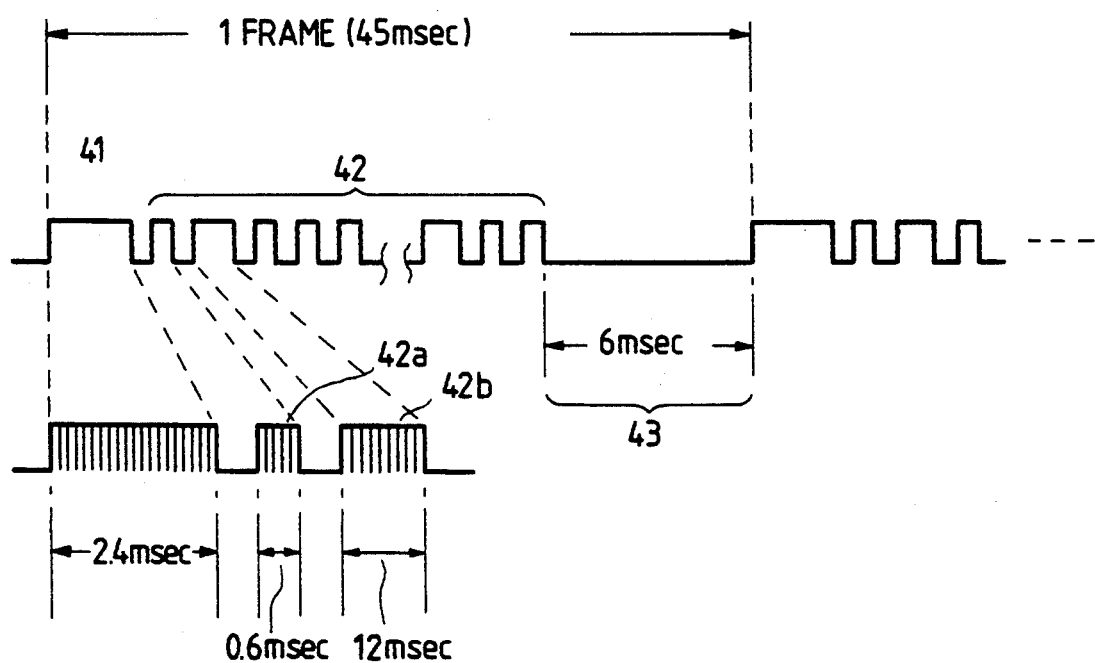
FIG. 3 is a diagram illustrating data bit pulses generated from the data transmitting means of FIG. 1.

One example of a data bit pulse train having a trailer added to each of the frames thereof is shown in FIG. 3 wherein reference numeral 41 designates a guide pulse defining the starting point of each of the frames of serial data bit pulses. This guide pulse has a pulse width of 2.4 msec, for example.

Further, following the guide pulse 41 there is provided a data code 42 which represents the numbers 1 and 0 by, for example, a pulse of 0.6 msec pulse width and a pulse of 1.2 msec pulse width, respectively, and provides predetermined data for transmission. In other words, the data code 42 is generated from the encoder 11 as a command signal corresponding to the operation designated by the operating means 1a of 1b of the operation unit 1.

Then, immediately after the data code 42 there is added by the trailer adding circuit 31 a 6 msec signal-free trailer 43 to thereby produce a train of data bit pulses with one frame period thereof being 45 msec, for example. Such data bit pulses are supplied to a modulating unit 12 where a carrier of 40 kHz from a carrier generating unit 13 is modulated by the data bit pulses and a modulating signal is generated from the infrared output unit 14.

Further, as shown in FIG. 2, an infrared receiving unit 32 in the instant embodiment includes a trailer discrimination circuit 33 for discriminating a trailer from the output of a detection circuit 23 and a switching circuit 34 which turns on and off the output of the decoder 24 and which is operated by a control signal from the trailer discrimination circuit 33.

The infrared signal generated from the remote controller 30 as a result of modulating the data bit pulses shown in FIG. 3 is received by a light-receiving section 21 of the infrared receiving unit 32 so as to be converted into an electrical signal which latter is then detected by the detection circuit 23 through an amplification circuit 22 to thereby obtain the initial data bit pulses shown in FIG. 3. In this case, the trailer discrimination circuit 33 judges the presence of a signal in the region of the trailer 43 and only when the trailer 43 is found to be free of any signal, it generates a control signal to turn on the switching circuit 34.

That is, with respect to the output of the detection circuit 23, only when the trailer 43 is found signal-free, a signal obtained b decoding the data bit pulses having such trailer is supplied to a system controller (microcomputer) of an electronic apparatus as a proper command signal.

Figure 4:
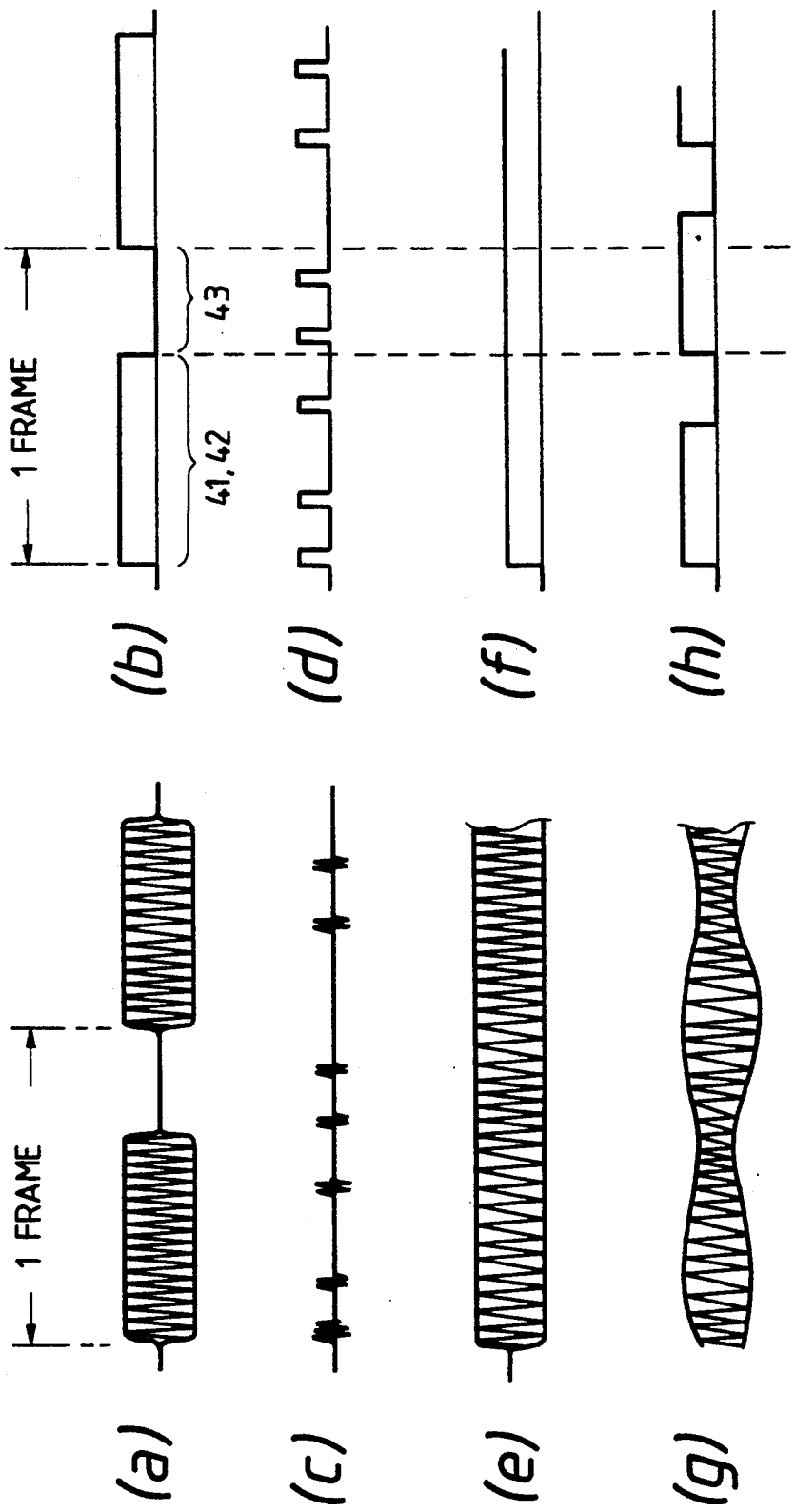
FIGS. 4(a)–(h) are a diagram showing waveforms per frame of data bit pulses and external noises received by the data receiving means of FIG. 2.

In FIG. 4 there is shown the waveform of signal received as an infrared output from the remote controller 30 and that of an infrared noise signal from an inverter-based fluorescent lamp, provided that the signal from the remote commander 30 is shown in the form of frame-unit envelopes.

When the modulating signal from the remote controller 30 is outputted in the form of infrared rays by the light-receiving section 21 of the infrared receiving unit 32, the output of the light-receiving section 21 is expressed in the form of an envelope waveform per frame as shown in FIG. 4(a) and by detecting this signal, there is obtained a detected output (with the waveform shown in FIG. 3) having, in its one frame, a data bit pulse portion comprising a guide pulse 41, a data pulse 42 and a subsequent trailer 43 as shown in FIG. 4(b).

In this case, at the trailer discrimination circuit 33 the absence of any signal (data bit pulses) in the region corresponding to the trailer is ascertained to turn on the switching circuit 34. Consequently, the output obtained by encoding the data bit pulses is generated from the infrared receiving section 32.

Next, it should be noted that even where a random waveform as shown in FIG. 4(c) is present as an output of the light-receiving section 21 as a result of the infrared receiving unit 32 having received infrared rays from a single inverter-based fluorescent lamp and a train of random pulses as shown in FIG. 4(d) is generated by detecting the output, such random pulses are not decoded at the decoder 24 and there is no possibility of generation of an erroneous command signal.

Further, where two fluorescent lamps are lighted by two inverters, respectively, to induce beats due to a frequency difference between infrared pulses resulting from stable sine waves (e.g., 45,000 kHz and 45,660 kHz) generated from the inverters and continuous (or uninterrupted) waveform as shown in FIG. 4(e) (refer to FIG. 9(e) with respect to the unit bit waveform) is received by the light-receiving section 21, the output of the light-receiving section 21 is detected in the form of a continuous waveform of FIG. 4(f) (refer to a pulse train envelope of FIG. 9(f)) but since the trailer discrimination circuit 33 judges the presence of any signal in the region corresponding to the trailer 43 with respect to the above-mentioned output of the light-receiving section 21, switching circuit 34 is turned off so that even if the detected output from the circuit 33 is erroneously decoded at the decoder 24, such decoded output is never generated from the infrared receiving unit 32 as a command signal. That is, the related electronic apparatus does not operate erroneously.

In addition, where three fluorescent lamps with inverters having frequencies of 45,010 kHz, 45,000 kHz and 45,660 kHz, respectively, are simultaneously lighted, the output of the light-receiving section 21 having received the infrared outputs of these fluorescent lamps would be in the form of the waveform shown in FIG. 4(g) and the detected output would be in the form of FIG. 4(h) (refer to FIG. 9(g) and (h) with respect to the corresponding bit unit waveforms). That is, a certain frame period takes place and signal-free regions appear periodically in the detected output according to circumstances.

However, there is almost no case in which the position and length of the signal-free region in one frame (a 6 msec region at the frame terminating end) coincide with those of the trailer 43 of FIG. 4(b) of the signal from the remote controller. Accordingly, the trailer discrimination circuit 33 will detect the presence of any signal in the region corresponding to the trailer 43 with respect to the detected output, the switching circuit 34 will be turned off and even if the output is erroneously decoded by the decoder 24, the output of the decoder will not becomes a command signal from the infrared receiving unit 32. That is, there is no possibility of the electronic apparatus operating erroneously.

This holds true even when there is an increase in the number of inverter-based fluorescent lamps to be lighted simultaneously. Anyway, by detecting the absence of a signal in the region corresponding to the trailer 43, it is possible to determine definitely whether or not the output of the detection circuit 23 is data relating to a command signal from the remote controller 30 or external noises from the fluorescent lamps.

Thus it has been found by experiments that with the use of the infrared data transmission-reception system of the instant embodiment, the probability of generation of erroneous operations of an electronic apparatus due to the lighting of an inverter-based fluorescent lamp(s) can be reduced down to as low as more than one-tenth of that in the case of the conventional system.

By the way, it should be noted that although in the instant embodiment, the length of the trailer 43 is determined to be equal to a 6 msec region (more than 2 times the length of the guide pulse 41 as the longest bit pulse), it may practically be 3 msec (a length of more than about 2 bits of the data bit pulse 42). However, in view of the prevention of an erroneous operation of the electronic apparatus, it is effective that the trailer 43 be made as long as possible.

Figure 5:
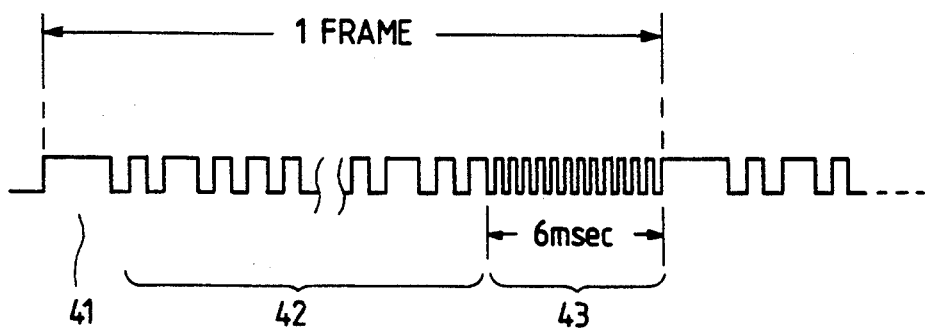
FIG. 5 is a diagram showing the waveform of data bit pulses according to another embodiment of the present invention.
Figure 6:
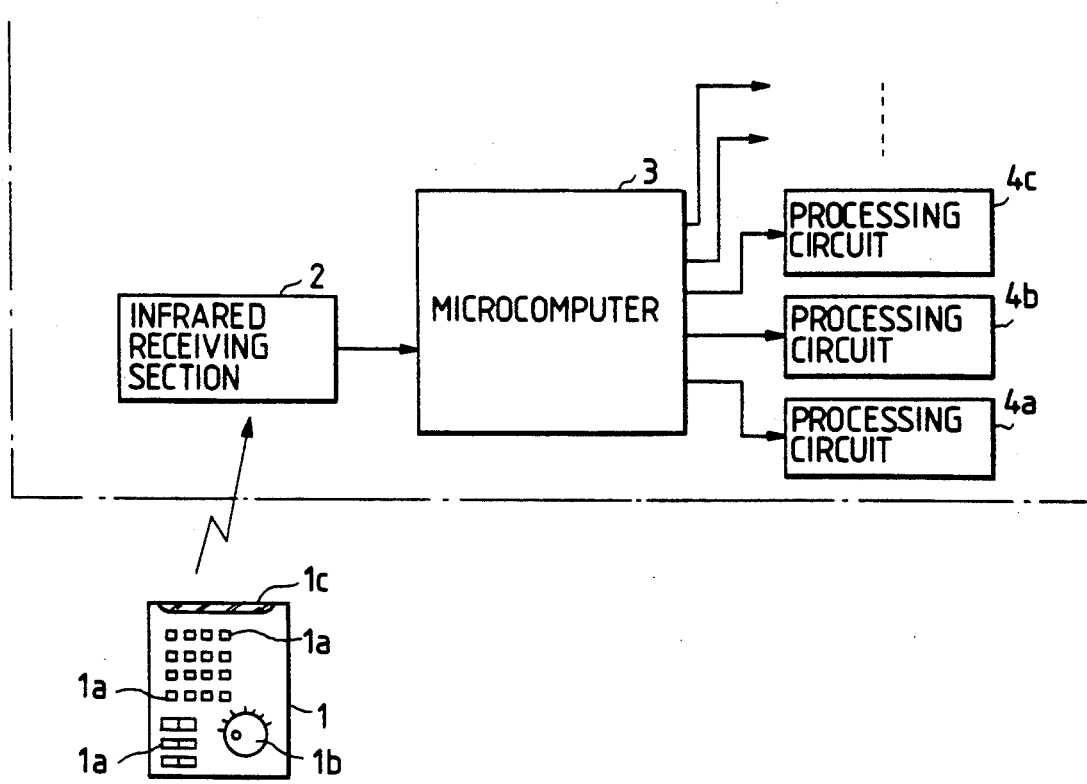
FIG. 6 is a block diagram of a conventional infrared remote control system.

In the instant embodiment, the trailer 43 is designated as a signal-free region but besides this, the remote controller 30 may be so constructed that as shown in FIG. 5, a signal having a frequency of more than two times that of the data bit pulses is added at the trailer adding circuit 31 to the data bit pulse output from the encoder 11 while the trailer discrimination circuit 33 of the infrared receiving unit 32 determines whether or not the output of the detection circuit 23 is data relating to a command signal from the remote commander 30 or external noises from the fluorescent lamp(s) depending on the detection, in the region corresponding to the trailer 43, of the frequency signal added by the trailer adding circuit 31.

In short, as the external noises coming from fluorescent lamps or other sources do not vary significantly in frequency only in a predetermined region, it is possible to perform a proper discrimination even according to the above system thereby preventing an electronic apparatus from operating erroneously.

The structure of the data transmission means and data receiving means according to the present invention is not always limited to those shown in FIGS. 1 and 2.

In the above embodiment, the data transmitting means is shown as the remote controller 30 and the data receiving means is shown as the infrared receiving unit 32 to be incorporated into an electronic apparatus so that a system is provided in which infrared command data is received and transmitted for remote-controlling the electronic apparatus. However, the above system may also be employed in such a manner that the transmission and reception units of the system are used between electronic devices for transmitting and receiving an audio signal or video signal in the form of infrared rays.

As described above, the infrared data transmission-reception system according to the present invention is so constructed that with respect to data for transmission and reception in the form of infrared rays, a signal-free region on a different frequency signal added region of a predetermined length is provided in a predetermined portion of each of frames of a data bit pulse train so as to distinguish between the infrared data and external noises. Consequently, the system has the effect of being able to accurately perform infrared data transmission even when infrared external noises are present and is also quite effective for the prevention of an erroneous operation with respect to a remote control system.

What is claimed is:

1. An infrared data transmission-reception system comprising:

data transmitting means including an encoder, trailer adding means, and modulating means for generating and transmitting various kinds of data in the form of an infrared signal obtained by modulating a train of data bit pulses from said encoder having a trailer portion added thereto;

data receiving means including detection means and trailer discrimination means for obtaining predetermined data from the train of data bit pulses by receiving and detecting the infrared signal generated by the transmitting means and for discriminating the trailer portion; and signal inhibit means connected to an output terminal of the detection means for inhibiting an output signal thereof in response to a discrimination signal output by said trailer discrimination means;

said trailer adding means being so constructed as to add the trailer portion as a signal-free region of a predetermined length to a terminating end of each frame of said data bit pulse train, and said trailer discrimination means being so constructed as to determine whether a portion belonging to the data bit pulse train obtained by receiving and detecting said infrared signal and corresponding to said signal-free region is free of any signal and to output said discrimination signal only when said portion is not found signal-free.

2. An infrared data transmission-reception system according to claim 1, wherein said data transmitting means is an infrared remote controller for use with an electronic apparatus and said data receiving means is an infrared receiving unit incorporated in said electronic apparatus, wherein said remote controller transmits to said infrared receiving unit infrared command data representative of operations designated by a distant user, and wherein said infrared receiving unit receives said command data and controls said electronic apparatus in accordance therewith.

3. An infrared data transmission-reception system according to claim 1, wherein said data transmission means transmits to said data receiving means an audio or video signal in the form of infrared rays.

4. An infrared data transmission-reception system comprising:

data transmitting means including an encoder, trailer adding means, and modulating means for generating and transmitting various kinds of data in the form of an infrared signal obtained by modulating a train of data bit pulses from said encoder having a trailer portion added thereto;

data receiving means including detection means and trailer discrimination means for obtaining predetermined data from the train of data bit pulses and trailer portion by receiving and detecting the infrared signal generated by the data transmitting means and for discriminating the trailer portion; and signal inhibit means connected to an output terminal of the detection means for inhibiting an output signal thereof in response to a discrimination signal output by said trailer discrimination means upon discriminating the trailer portion;

said trailer adding means being so constructed as to add to a terminating end of each frame of said data bit pulse train the trailer portion formed as a region of a pulsating signal whose pulse repetitive period is more than double that of a repetitive period of said data bit pulses, and said trailer discrimination means being so constructed as to determine whether a portion of a data bit pulse train obtained by detecting said infrared signal from said data transmitting means is formed of said pulsating signal and to output said discrimination signal only when said portion is not formed of said pulsating signal.

5. An infrared data transmission-reception system according to claim 4, wherein said data transmitting means is an infrared remote controller for use with an electronic apparatus and said data receiving means is an infrared receiving unit incorporated in said electronic apparatus, wherein said remote controller transmits to said infrared receiving unit infrared command data representative of operations designated by a distant user, and wherein said infrared receiving unit receives said command data and controls said electronic apparatus in accordance therewith.

6. An infrared data transmission-reception system according to claim 4, wherein said data transmitting means transmits to said data receiving means an audio or video signal in the form of infrared rays.

* * * * *